April 7, 1931.   P. R. SCHNEEWEISS ET AL   1,799,194
AUTOMATIC CONTROL FOR LANDING AIRPLANES
Original Filed Sept. 16, 1929    3 Sheets-Sheet 3

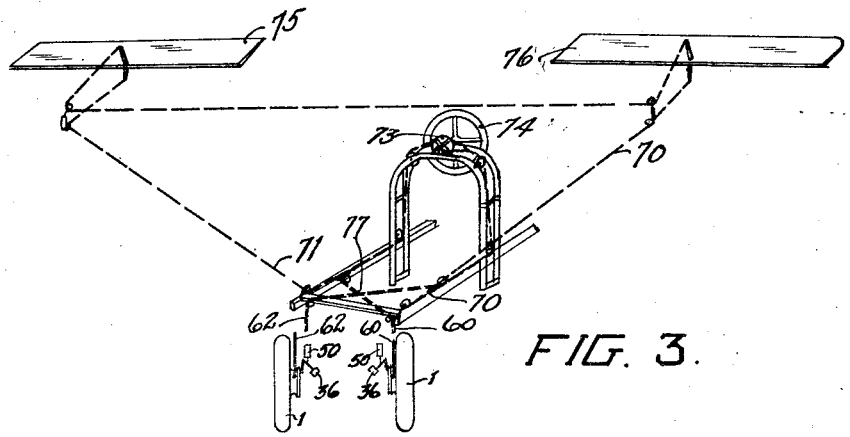
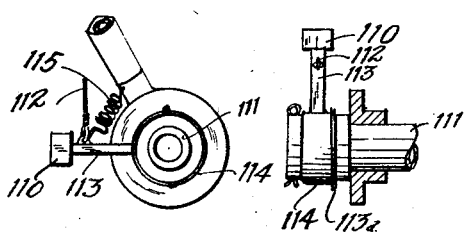 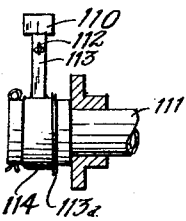 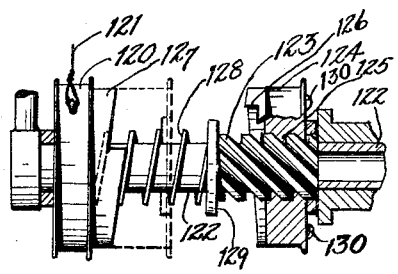
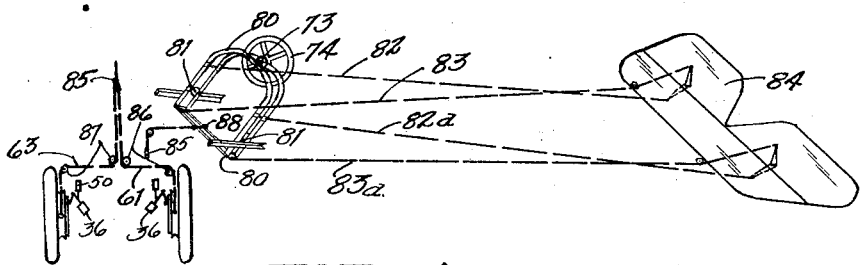

Patented Apr. 7, 1931

1,799,194

UNITED STATES PATENT OFFICE

PETER R. SCHNEEWEISS, OF CLEVELAND, AND JOHN H. LEONARD, OF LAKEWOOD, OHIO; SAID LEONARD ASSIGNOR TO SAID SCHNEEWEISS

AUTOMATIC CONTROL FOR LANDING AIRPLANES

Application filed September 16, 1929, Serial No. 392,817. Renewed January 22, 1931.

Our invention relates to a means for stabilizing heavier than aircraft such as airplanes, gliders and the like. It is well known that in the present type of airplanes very great difficulty is encountered in landing the plane safety. For a perfect landing it is necessary that both wheels come in contact with the ground at substantially the same instant, and that the elevating rudder be lifted so as to bring the tail skid of the plane firmly against the ground, simultaneously with the landing wheels. The human reaction, especially when ground is partially obscured by fog or mist, is not sufficiently quick or reliable at all times to perform this operation at exactly the right time.

As a result it quite often happens that during the short interval that elapses between the time the wheels touch the ground and the operator throws his control to force the tail of the plane down, the plane pivots about the wheels or "noses over", driving the engine and propeller against the ground.

Again, due to the unevenness of the ground one wheel may touch the ground even though the plane is on an even keel, tending to swerve the plane about that wheel, often wrecking the plane. Cross winds also tend to cause one wheel to engage the ground before the other, or cause the plane to turn over on its side even when both wheels touch the ground at the same instant. This usually results in serious damage to the wings. Likewise the same dangers result from landing the plane at too steep an angle of attack with the ground.

It is an object of our invention to overcome these difficulties and to eliminate the dangers mentioned, and to automatically control an airplane in landing the same.

Another object of our invention is to provide a means for automatically righting a plane when it comes in contact with the ground with too great an angle of incidence.

It is another object of our invention to level the plane laterally in case either one of the wheels touches the ground before the other, or in case a cross wind tilts the plane up or thrusts it sideways as it lands.

Another object is to automatically level off the plane the instant the wheels engage the ground and to retain it on an even keel on rough ground.

Another object of our invention is to construct a device which is very economical to manufacture, and which can be attached to or embodied in any of the present type of airplanes.

Further objects and advantages of our invention will become apparent from the following specification, in which reference is made to the drawings by numerals, the same numerals designating the same parts in various views.

In the drawings—

Fig. 3 is a diagrammatic illustration of the aileron control system of an airplane, showing our invention attached to control the ailerons.

Fig. 4 is a diagrammatic illustration of a control system for the elevating rudder of an airplane, operated by our invention.

Figs. 6 and 7 are respectively side elevation and plan view of still another form of our invention.

Figs. 8 and 9 are elevations of a third and a fourth modified form of our invention.

Figure 1:
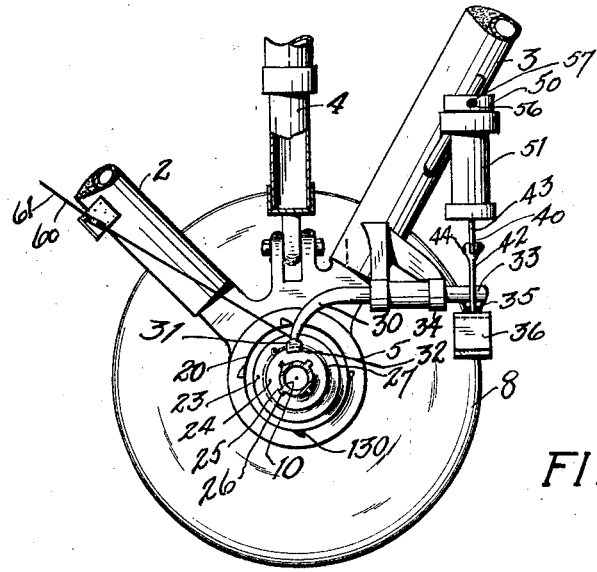
Fig. 1 is a side elevation of a preferred form of our invention.
Figure 2:
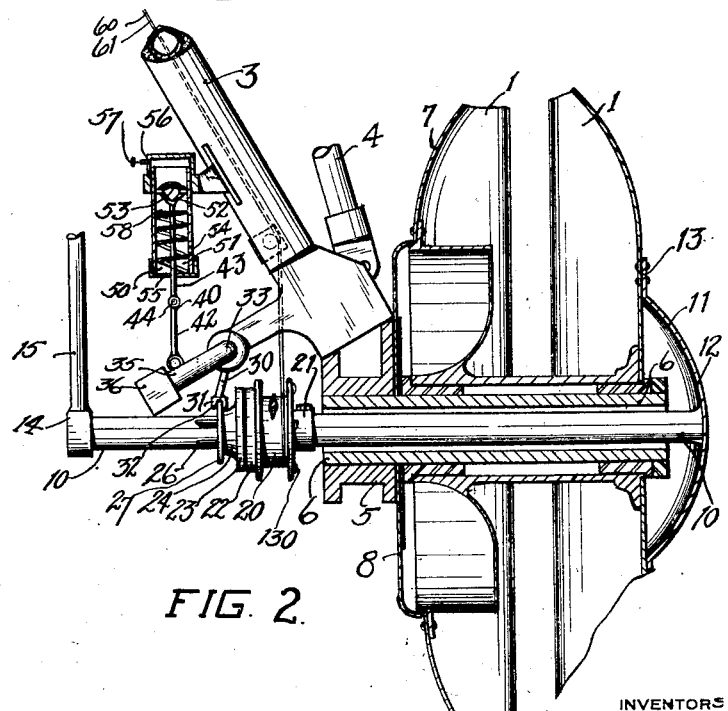
Fig. 2 is a front elevation of the form shown in Fig. 1, certain portions being shown in section for the purpose of clearness.

Referring to Figs. 1 and 2 of the drawings, which illustrate the preferred form of our invention, a portion of one of the usual types of landing gear is shown having wheels 1, the plane supporting struts 2 and 3 and shock absorber 4 connected to a hub 5, in which is secured a hollow axle 6 on which a landing wheel 1 is rotatably mounted. The wheel 1 illustrated is of the usual disk type, having an internal brake, not shown, protected by a cover plate 8. In this type of wheel our invention may easily be installed and operated by means of a shaft 10, passed through the axle 6 and suitably secured to and concentric with the wheel 7, so as to rotate therewith.

A convenient means of attaching the shaft 10 is illustrated and includes a hub cap 11, to which the shaft 10 may be welded, as at 12, the hub then being secured to one of the disks of the wheel by suitable means such as rivets 13. The other end of the shaft may be supported, preferably by being rotatably mounted in a suitable bearing 14, which is held in place by a strut 15 secured to the frame of the plane or to one of the other struts, as better illustrated in Fig. 5. On the shaft 10 is a drum 20 relatively rotatable with the shaft. The drum 20 is prevented from sliding toward the wheel by means of a collar 21 secured to the shaft 10. A clutch disk 22 is provided on the face of the drum 20 on the side opposite the collar.

A complementary clutch disk 23 concentric with the shaft 10 is slidably mounted thereon and is free to move into and out of contact with the clutch disk 22. The clutch disk 23 is provided with a hub portion 24, the hub being provided with axial keyways, such as at 25, for engaging splines 26 on the shaft 10. A convenient means of actuating the clutch disk 23 in the desired manner is illustrated in Figs. 1 and 2, and includes lever arm 30 having a head portion 31, in which is a keyway 32 adapted to engage an annular flange 27 on the hub portion 24, allowing the clutch disk to rotate freely with respect to the head portion 31. The lever arm 30 is mounted on a shaft 33, which is rotatably secured in a bearing 34, the bearing preferably being horizontal, and secured to one of the struts 3 of the plane. The other end of this shaft is provided with lever arm 35, which carries a weight 36.

This lever arm is preferably disposed at an angle of approximately 45° with the horizontal. A plunger shaft 40 is pivotally secured to the lever arm 35, as illustrated at 41. This plunger shaft 40 preferably is formed in two portions 42 and 43, with an intermediate pivot joint 44 to allow the plunger arm 43 to operate in proper alignment as the lever arm 35 swings through an arc.

A form of dashpot 50 secured to one of the struts, such as 3, is desirable for regulating the action of the lever arms. This dashpot includes a cylinder 51 in which the plunger 52, actuated by the plunger arm 43, is slidably operable. The plunger 52 is provided with a valve 53 which operates to allow passage of air into the hollow cylinder 51 as the plunger moves down and to prevent its escape past the plunger as the plunger rises. Suitable openings such as 54 or 55 are provided in the cylinder 51 to permit free access of air beneath the plunger head 52.

Toward the top of the cylinder 51, above the uppermost position of the plunger, is provided a constricted opening 56. Suitable means, such as a screw valve 57, may be provided to regulate the size of this opening. A suitable collar 58 is rigidly secured to the plunger arm 43 within the cylinder. Between this collar and the base of the cylinder are held resilient return means, such as a spring 59. If desirable, the collar 58 may be so secured to the plunger arm 43 that the compression of the spring can be regulated. Such a mounting might include, for instance, a small collar (not shown) placed above the collar 58 on the plunger arm 43, and provided with a set screw to secure it at any desired position along the shaft.

Flexible connectors, such as wires 60 and 61 are secured to the drum 20 and are adapted to wind thereabout, as the drum is rotated. These connectors operate the ailerons and elevating rudder of the plane. To prevent slack in these connectors, which would result in sudden jerks as the drum begins revolving rapidly in use, a number of small air cups 130 are placed about the periphery of the drum and formed with a sloping surface and a straight surface, the sloping surface preceding the straight surface in the direction of rotation. These cups cause greater air pressure on one side of the drum than on the other and consequently cause the drum to turn in a clockwise direction and thus remove the slack in the connectors by winding them about the drum.

It is desirable that one of our devices be attached to each wheel of the plane. While a connector to the ailerons and one to the elevating rudder may both operate off of each drum, for clearness in illustration, we have shown in Fig. 3 only the connectors to the ailerons and in Fig. 4 only those to the elevating rudder, such connectors being shown in dotted lines.

Referring now to this control diagram, which illustrates one of the forms of control mechanism now generaly used and includes a steering wheel and pivoted frame, the connectors 60 and 62 are shown attached to drums such as described. These connectors 60 and 62 are directed by suitable pulleys to engage the control connectors 70 and 71 of the plane. In the diagram shown these connectors pass about a winding drum 73 operated by steering wheel 74. It should be noted that if the drum is rotated toward the aileron 75, the connector 70 is put under tension and 71 slacked, thus raising the aileron 75 and lowering aileron 76. Since to stabilize or level the plane it is necessary to raise the aileron on the side opposite the low side and concurrently to lower the one on the low side, it will be apparent that the connectors 60 and 62 should be crossed as shown at 77. However, it is apparent that a different connection could be made by cutting into the connectors 70 and 71 at different points and that the cross connection shown is merely for convenience, so that great length of flexible connectors will not be necessary.

Referring to Fig. 4, the elevating rudders 84 are operated by movement of the supporting frame 80 of the steering wheel forward and backward. This steering wheel frame is pivoted as shown at 81, and operates the elevating rudder by suitable connectors such as 82, 82a, 83 and 83a. The connectors 82 and 82a are secured to the frame above the pivot 81, and 83 and 83a are secured below pivot 81. Flexible connectors 61 and 63, adapted to wind about the drums, such as drum 20, as do 60 and 62, operate the steering wheel frame. The connectors, for convenience, may be united at a common point 85 and directed through pulleys such as at 86 and 87 so as to engage the frame work 80 at a convenient point, such as 88, below the pivot 81 of the frame. The connection 85 of the connectors 61 and 63 should of course be far enough removed from the pulleys so that when the connectors are wound on the drum the greatest distance the common connection 85 will still be slightly removed from the pulleys 86 and 87 and not torn apart as would otherwise happen.

It can readily be seen that as the connectors 61 and 63 are wound on the drums the lower part of the frame 80 is pulled forward, stressing the connectors 83 and 83a under tension, slacking the connectors 82 and 82a. It is apparent that such action elevates the tail rudder, which of course forces the tail down.

Figure 5:
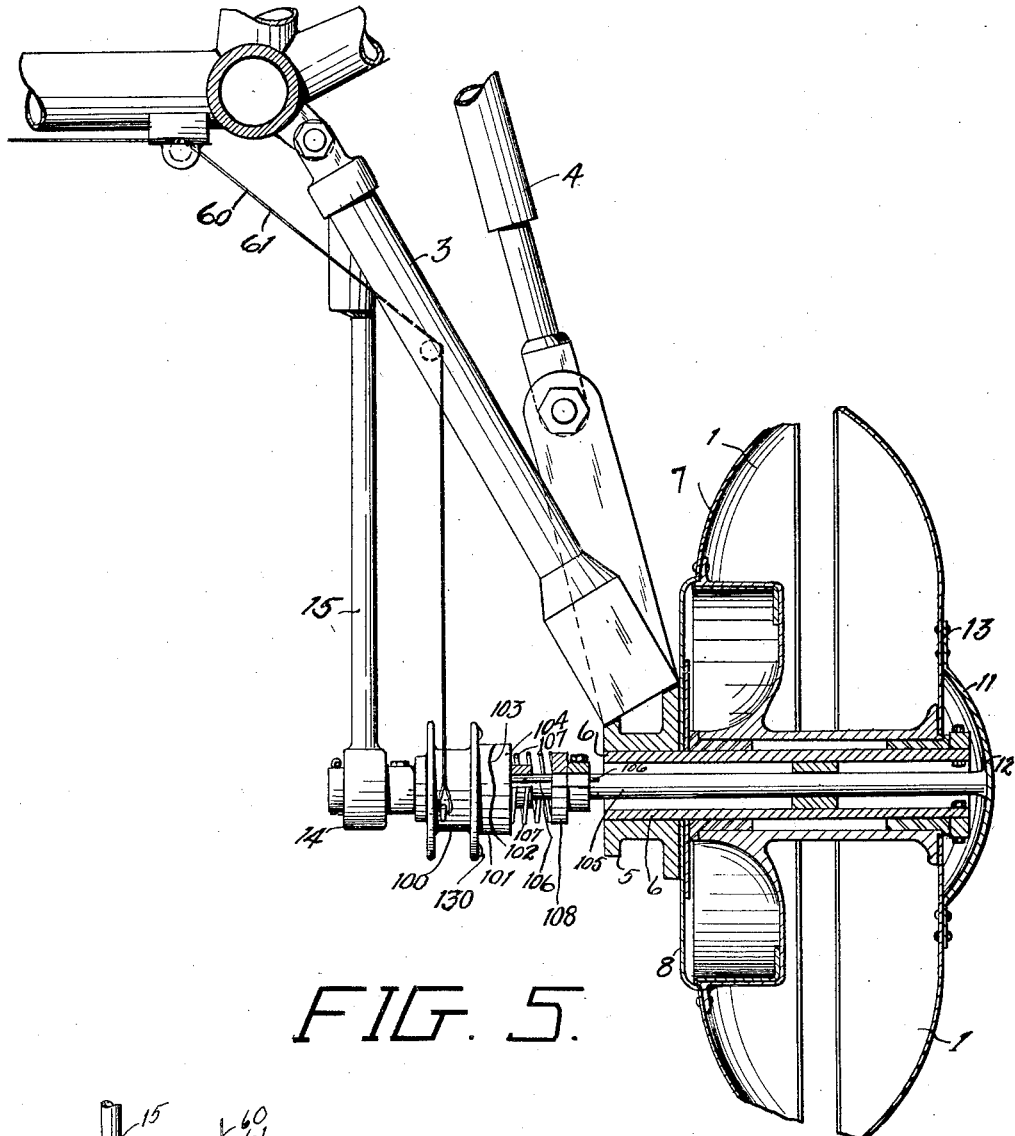
Fig. 5 is a front elevation of a modified form of our invention.
Figure 9:
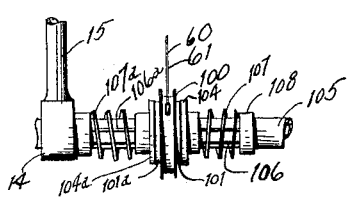

Fig. 5 illustrates a modified form of our invention, in which a drum 100 similar in form and function to the drum 20, is employed. This drum is mounted on and is relatively rotatable with a shaft 105, similar to the shaft 10, and is provided with a clutch disk 101, preferably having the portion of its face 102 near the periphery in the form of shallow convolutions 103. The complementary clutch disk 104 with a similarly convoluted face is adapted to slidably engage a shaft 105 and to rotate therewith due to engagement with the splines 106. Resilient means such as a spring 107 are secured between a collar 108, mounted on shaft 105, and the clutch disk 104, so as to hold it in contact with the clutch disk of the drum and thus rotate the drum as the clutch disk 104 rotates. This spring 107 exerts a predetermined pressure against the disk 104. Different degrees of pressure may be obtained by securing the collar 108 at different distances from the clutch disk 104, and thus changing the compression of the spring. Flexible connectors 60 and 61, such as previously described, are secured to the drum 100 and adapted to wind thereon. The spring is adjusted so that when certain tension has been reached on the connector, the clutch disk will tend to slip and allow the clutch disk 104 and shaft 105 to rotate relative to the drum 100. Fig. 9 illustrates a slightly modified form of Fig. 5, having two smooth faced clutch disks engaging the drum, the parts being designated by the same numerals as used in Fig. 5 for ease in comparing the two.

In lighter planes and hydro-airplanes, it might be preferable to use the modification shown in Figs. 6 and 7, wherein the entire operating force is obtained from a weight 110, which swings about a shaft 111 as a pivot, when the wheels strike on the ground. In such case the connectors 112, having the same purpose as those previously described, might be attached directly to the lever arm 113, which supports the weight 110, or a suitable drum 113a might be provided on the bearing 114 which supports the weight.

It should be noted in this case that the shaft 111, on which the weight is relatively rotatably mounted, is stationary. Suitable return means such as spring 115 are provided to dampen the shock on the connectors, as the weight swings downward, also to return the weight to its starting position, thus slackening the connector 112 so that the plane may again be operated from the usual controls. Also in the use of our invention on seaplanes, wheels capable of being turned by friction of the water and forward motion of the plane can easily be supplied, which will operate the same as the landing wheels of a land airplane, as far as our invention is concerned.

Again, it may be found convenient to use another form of our invention, as illustrated in Fig. 8. In this form a drum 120 to which are secured connectors, such as 121, which operate as previously described, is mounted on a shaft 122 and relatively rotatable therewith. This shaft is secured to the wheel 1 (not shown) and rotated thereby, similar to the shaft 10 above discussed. A portion of this shaft carries a worm gear 123, having a high pitch thread, for instance about a 45° pitch. A relatively heavy disk 124 having complementary threads 125 adapted to engage the threads of the worm gear 123 is mounted on the shaft 122. This disk carries a cam 126 adapted to engage complementary cam 127 on the drum 120 so as to lock the disk and drum in the direction of rotation but leave them otherwise free to rotate independently. Intermediate the drum and disk are resilient return means such as a spring 128, bearing against the drum at one end, and a collar 129 at the end adjacent the disk.

Air fins such as 130 may be provided on the disk to cause it to turn in the direction of rotation of the wheel and shaft 122. As the wheel of the plane strikes the ground the shaft rotates in the direction of motion of the plane. Due to the high pitch of threads 123 of the worm gear and the inertia of the disk 124, the disk revolves in the same direction and at the same time moves longitudinally of the gear toward the drum 120. As the disk is driven toward the drum 120, it engages the collar 129 with sufficient force to compress the spring 128. The internal diameter of the threads of the disk is such that it may pass off of the worm gear on the smooth shaft 122. It continues to move toward the drum at the same time spinning rapidly in a forward direction, due to the initial force imparted by the worm gear 123. The cams 126 and 127 engage and give the drum a quick turn forward, the amount of which can be regulated, as for instance, by the weight of the disk 124 and the strength of the spring 128. The position of the disk 124 and cam 126 when the cams are in engagement is shown in dotted lines. Due either to the tension on the connector 121 or to previous regulation of the spring, the disk 124 soon loses its spinning motion and longitudinal force. The spring 120 then expands, forcing the cams 126 and 127 out of engagement. As the rotation of the axle slows down or ceases the spring 128 drives the disk 124 onto the worm gear.

Subsequently during a flight, the wind pressure on the fins 130 winds the disk back to its starting position. In starting the plane, the shaft 122 starts from a dead stop and gradually increases its speed of rotation. In such case the disk is not held back sufficiently by its own inertia so as to derive a heavy axial thrust from the worm gear, and so it does not move over and engage the cam on the drum as in the case of a sudden quick rotation of the shaft. This leaves the controls free to be operated by hand on starting, but insures prompt action upon landing.

Referring to the preferred form of our invention the operation is as follows:

As either wheel 1 of the plane touches the ground, due to the shock of impact, the weight 36 swings downward. Likewise, since the weight is disposed at an angle from the horizontal through its pivot point, a sidewise impact or shock will have the same effect. The wheels rotate, due to the forward motion of the plane and frictional engagement of the wheels with the ground, and in turn rotate the shaft 10. As the weight swings downward, it moves the lever arm 30 which forces the clutch disk 23 into contact with the clutch disk 22 of the drum 20. The shaft 10 is turning with the rotation of the wheel, and, due to the splines 26 thereon engaging the clutch disk 23, this disk turns and by frictional engagement with the clutch disk 22 turns the drum 20, winding the flexible connector thereon and operating the controls as described. For instance, as the wheel illustrated touches the ground and so tightens the connector, the tail elevator is lifted, forcing the tail down, concurrently therewith, the aileron on the same side as the wheel is depressed, the one on the opposite side raised, tending to force the opposite side of the plane down and tending to lift the lower side, thus easing off the side which has struck the ground. As this is practically instantaneous, the plane rights itself almost immediately on contact with the ground. If both wheels strike the ground at the same instant, the ailerons are drawn into natural position.

Too quick action of the clutch disks is prevented by the spring 58, which compresses as the weight swings downward. Also as the weight moves downwardly it draws with it the plunger. The valve 53 opens, admitting air to the upper portion of the cylinder 51. Due to the increasing resistance of the spring as it is compressed, the weight operates quickly, but without a sudden jerk which might snap the connectors. Almost immediately the weight starts rising again, due to the spring, and releases the clutch disk 23 from the clutch disk 22 on drum 20, so that the controls of the plane are again free for operation by the usual hand controls.

Too rapid return of the weight is prevented by the air which is trapped by the cylinder on the downward stroke and which must be forced through the restricted opening 56, as the spring draws the weight back to starting position. It should be noted that since the weight is supported on a lever arm disposed at an angle for instance of 45° to the horizontal, that a side impact on the plane will cause it to move downwardly the same as would a more direct vertical impact. Thus our invention operates to level off the plane and right it in case a cross wind blows it against some obstruction to the side as it lands.

It is apparent that by regulating the size of the weight and spring and restricted air passage, almost any refinement of control can be obtained. Furthermore, it is obvious that if one wheel strikes the ground with a side thrust, that the controls would operate the same as upon landing.

While we have particularly described our invention as adapted for use on a plane controlled by the usual flexible cables or chains, it could with slight changes be applied to airplanes operated by the more recent control systems, such for instance, as the straight or rigid rod connections or the hydraulic controls, either by operating the hand controls by flexible connectors the same as in the present case, or by pumps, conduits or semi-rigid beams operating directly from our invention. Again, it may be found convenient to operate ailerons directly from our invention in an entirely independent system of controlling cables. All such changes could easily be made by anyone skilled in the art.

It is to be understood that, while we have described our invention in detail only as to one or two of the better forms and by way of illustration, in connection with a control including a winding drum on the steering wheel and pivoted frame, we do not intend to be limited merely to such forms and such combination, but mean to include the numerous forms and adaptations which may be used and made, and the use of such forms with various systems of control and operating control levers.

It is apparent that our invention does not merely contemplate operation of both ailerons and the elevating rudder by the apparatus of our invention, but includes the operation of either of the two separately, the other being independently operable by the usual methods.

Further, we do not intend to limit our invention in application to airplanes but intend to include its use with all types of heavier than aircraft, such as airplanes, gliders and the like. The word "aircraft" as used in the appended claims denotes heavier than flying apparatus such as above described.

We claim:

1. In an aircraft having ailerons, elevating rudder and landing elements, means actuated by contact of the landing elements of the airplane with a landing surface for automatically controlling the ailerons and elevating rudder.

2. In an aircraft having ailerons, elevating rudder and landing elements, means actuated by contact of the landing elements of the airplane with a landing surface for automatically controlling the ailerons and elevating rudder, said means being operable by the impact of the plane upon landing.

3. In an aircraft having ailerons, elevating rudder and landing elements, means actuated by contact of the landing elements of the airplane with a landing surface for automatically controlling the ailerons and elevating rudder, said means being operable by the forward motion of the plane upon landing.

4. In an aircraft having ailerons, elevating rudders and landing elements, including supporting wheels, means to stabilize the plane when landing, said means including means to operate the ailerons and elevating rudders, said operating means being actuated by a rotatable drum, and means to operate said drum concurrently with the impact of the wheels against the landing surface.

5. In an aircraft having ailerons, elevating rudders and landing elements, including supporting wheels, means to stabilize the plane when landing, said means including means to operate the ailerons and elevating rudders consequent upon rotation of the landing wheels concurrently with their moving contact with the landing surface.

6. In an aircraft including ailerons, elevating rudders and landing elements, means for simultaneously actuating said ailerons and elevating rudders upon contact of the landing elements with a landing surface, said means including a clutch and means for automatically actuating said clutch consequent upon landing contact.

7. In an aircraft including ailerons, elevating rudders and landing elements, means for simultaneously actuating said ailerons and elevating rudders upon contact of the landing elements with a landing surface, said operating means including a disengageable clutch.

8. In an aircraft having ailerons, elevating rudders and landing elements, means actuated by contact of the landing elements of the airplane with a landing surface for automatically controlling the ailerons and elevating rudders, and means to release said controlling means after setting the ailerons and elevating rudders to landing position.

9. In an aircraft having ailerons, elevating rudders and landing elements, including supporting wheels, means to stabilize the plane when landing, said means including means to operate the ailerons and elevating rudders, said operating means being actuated by a rotatable drum, means to operate said drum concurrently with the impact of the wheels against the landing surface, and means to release said drum after movement of the ailerons and elevating rudders.

10. In an aircraft having ailerons, elevating rudders and landing elements, including supporting wheels, means to stabilize the plane when landing, said means including means to operate the ailerons and elevating rudders, said operating means being actuated by a rotatable drum, means to operate said drum concurrently with the impact of the wheels against the landing surface, and means to release said drum at predetermined revolutions of said drum.

11. In an aircraft having ailerons, elevating rudders and landing elements, including supporting wheels, means to stabilize the plane when landing, said means including means to operate the ailerons and elevating rudders, said operating means being actuated by a rotatable drum, means to operate said drum concurrently with the impact of the wheels against the landing surface, and means to release said drum at predetermined stresses on the operating means.

12. In an aircraft having ailerons, elevating rudders and landing elements, including supporting wheels, means to stabilize the plane when landing, said means including means to operate the ailerons and elevating rudders, said operating means being actuated by a rotatable drum, and drum operating means including a worm gear of relatively high pitch and rotatable disk engaging said worm gear and movable axially of said gear, and having a cam surface adapted to engage complementary cam surfaces on the drum, and means to disengage said cam surfaces.

13. In an aircraft including ailerons, elevating rudders and landing elements, means for simultaneously actuating said ailerons and elevating rudder upon contact of the landing elements with a landing surface, said means including a drum and a disk frictionally engaging said drum.

14. In an aircraft including ailerons, elevating rudders and landing elements, means for simultaneously actuating said ailerons and elevating rudder upon contact of the landing elements with a landing surface, said means including a plurality of disks in frictional engagement, and means to hold said disks in engagement under a predetermined pressure.

15. In an aircraft having an elevating rudder and landing elements, means actuated by contact of the landing elements of the aircraft with a landing surface for controlling said elevating rudder.

16. In an aircraft having ailerons and landing elements, means actuated by contact of the landing elements of the aircraft with a landing surface for controlling the ailerons.

In testimony whereof we hereunto affix our signatures.

PETER R. SCHNEEWEISS.
JOHN H. LEONARD.